Jan. 7, 1936.  D. A. GREENE  2,026,972

WINDOW GLASS GUIDE

Filed March 5, 1935

Inventor,
Daniel A. Greene
by L. H. Harriman
Atty.

Patented Jan. 7, 1936

2,026,972

UNITED STATES PATENT OFFICE 2,026,972

WINDOW GLASS GUIDE

Daniel A. Greene, Flint, Mich.

Application March 5, 1935, Serial No. 9,411

10 Claims. (Cl. 296—44.5)

This invention relates to window glass guides which are usually employed in connection with the frameless window glass of closed body automobiles, and which are adapted to be bent to conform to curved window casings, and to methods of making the same.

While guides of this type have been constructed with a wire core which is bendable, the type of guide which has been most generally employed is provided with a core of thin sheet metal, which is notched, or slit in a manner to permit bending.

The primary objects of my invention are to provide a core for a guide of the sheet metal type, and a method of making the same, which will enable a guide to be produced which shall have all of the advantageous characteristics of guides of this type which have previously been employed, but which may be produced at a decreased manufacturing cost.

I accomplish this object primarily by providing a strip of thin sheet metal of uniform width, transversely slitting the strip from each edge to points adjacent the opposite edge alternately, then stretching the strip thus formed, so that the oppositely extending adjacent portions extend divergently from their point of connection, thereby producing a strip of zig-zag form which is approximately double the length of the original strip, and, as this stretching operation causes the zig zag strip sections to be distorted, or inclined to the plane of the original strip, a further step in the process consists in restoring said sections to a common plane by a pressing operation, while held stretched, after which the operation of covering the strip with sheet material to which cushioning material is attached, will be performed.

For a more complete disclosure of the invention reference is made to the following specification in connection with the accompanying drawing, in which.

According to my invention I provide a strip of thin sheet metal $a$ of indefinite length and of a uniform width, suitable to form a core for a window glass guide, and cut a series of transverse slits $b$ therein, which extend alternately from the opposite edges of the strip to within a short distance from the opposite edge from which the slit extends, this distance preferably approximating to the distance between adjacent slits.

Figure 3:
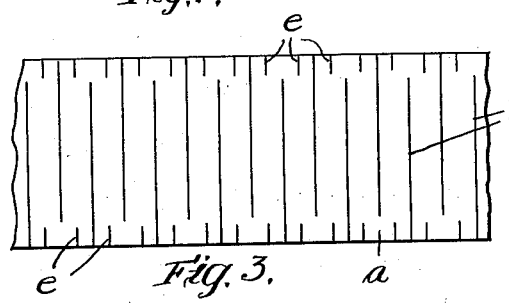
Figs. 3, 4, 5, 7 and 8 are plan views.
Figure 4:
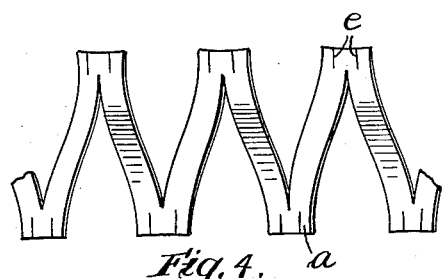
Figure 6:
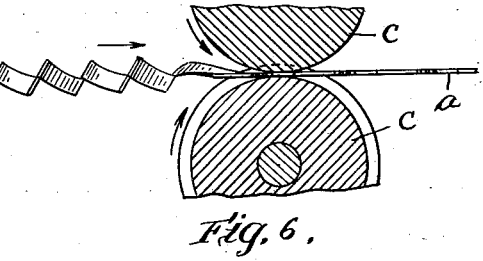
Fig. 6 is an edge view of a section of the core strip illustrating different steps in the method.

The strip is, therefore, not severed completely across at any point and a single narrow strip is formed, which extends alternately, crosswise of the original strip as shown in Fig. 3. The original strip is then subjected to longitudinal strain, so that each slit is opened into a V-shaped formation, and the narrow strip extends in zig-zag form, as shown in Fig. 4. This longitudinal stretching of the original strip necessarily causes a distortion of the zig-zag strip, all portions of which will be tilted into positions which are inclined to the plane of the original strip, as indicated in Figs. 4 and 6.

Figure 5:

While thus held in stretched form, the inclined portions are then forced back into the plane of the original strip by a pressing operation. This may be done by pressing the distorted zig zag strip between flat plates, or platens, but is preferably done by passing the same between press rolls $c$, as indicated in Fig. 6. As it is necessary to keep the edges of the stretched strip in alignment, one of these rolls is circularly recessed or grooved, and the other is fitted therein, the width of the groove corresponding to the width of the strip after stretching, so that after the strip has been passed between the rolls, the twisted sections will lie flat with their apices approximately in straight parallel lines, as shown in Figs. 5 and 6.

Figure 7:
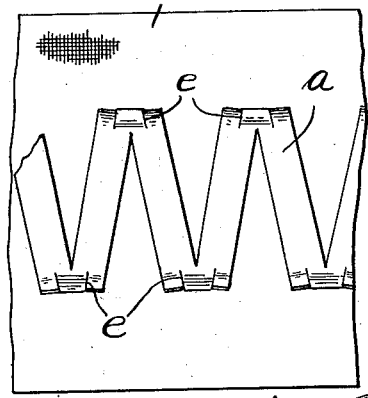
Figure 8:
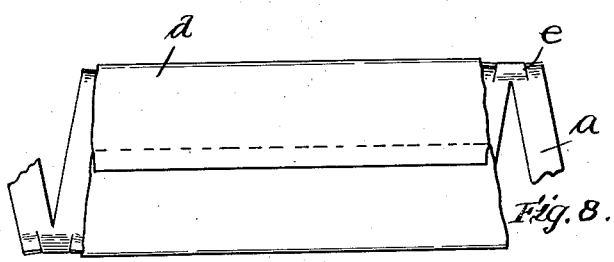

It will be understood that the above described flattening operation will be merely a preliminary portion of the subsequent rolling operation by means of which the covered channel or guide is formed, a textile covering, as $d$, being wrapped about the stretched strip before, or as it is bent into channel form, as indicated in Figs. 7 and 8, this portion of the operation being substantially the same as that in general use.

Figure 1:
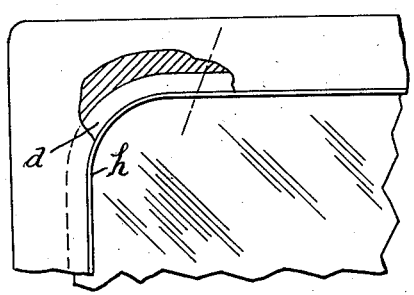
Fig. 1 is a side elevation illustrating a guide produced by my process installed in a window casing.
Figure 2:
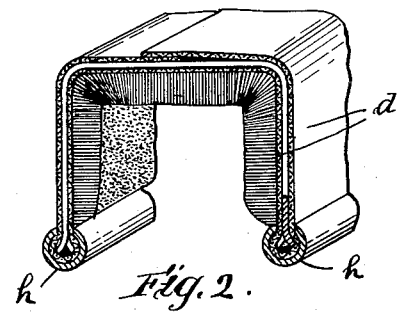
Fig. 2 is a combined sectional and perspective view of the finished guide on an enlarged scale.
Figure 9:
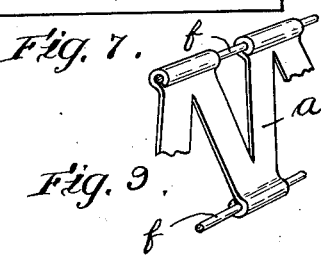
Figs. 9 and 10 are perspective and plan views respectively illustrating modifications.
Figure 10:
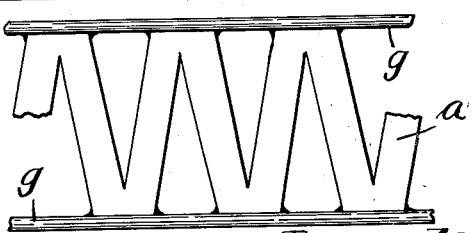

As it will ordinarily be necessary to mount a finish bead of ornamental metal on the edges of the channel, this may be done by enlarging the edge portions by various methods, several of which are illustrated. As shown in Fig. 3, a series of short slits $e$ may be formed in the edges of the strip, and by a subsequent operation, the edge portions may be bent laterally to form alternately oppositely extending tongues, as disclosed in Bailey Patent No. 1,955,729 of April 24th, 1934, or the edge portions may be rolled over a wire $f$, as shown in Fig. 9, or a wire $g$ may be spot welded onto said edge portions, as shown in Fig. 10, thereby providing, in each instance, enlarged edge portions about which the bead $h$ may be clamped as shown in Fig. 2, in which the completed channel, having cushioning material attached to the textile covering $d$, is illustrated.

By means of the above described method, the length of the original strip of sheet metal may be increased by approximately 100%, and, at the same time, it is formed into a series of narrow transverse strips which are connected at the edges of the channel, so that it may be bent to correspond to the curvature of the window casing, the transverse strips being swung apart slightly by the bending operation and the textile covering therebetween being slightly stretched.

As will be noted, the principal advantage of the above described method consists in the saving of metal for forming the core, as no metal is removed, or wasted and the length of the finished channel which is produced from a strip of metal of a certain length may be doubled, without impairment of its efficiency as a core for the channel.

I claim:

1. A glass run channel comprising a generally channel shaped core portion of flat continuous sheet metal having a base and side walls, said core portion having transverse slits extending alternately partly across the same from opposite edges of its sides, and the edges of said slits being spaced apart at their open ends.

2. A glass run channel comprising a generally channel shaped core portion of flat, continuous sheet metal, said core portion having transverse slits extending alternately from opposite edges of its sides, each slit terminating adjacent the opposite edge from which it extends and being of greatest width at its open end.

3. A glass run channel comprising a generally channel shaped core portion of flat, continuous sheet metal, said core portion having transverse slits extending alternately from opposite edges of its sides, each slit terminating adjacent the opposite edge from which it extends and decreasing in width from its open to its closed end.

4. A glass run channel comprising a generally channel shaped core portion of flat, continuous sheet metal, said core portion having transverse slits extending alternately from opposite edges of its sides, each slit terminating adjacent the opposite edge from which it extends and tapering in V-form from its open to its closed end.

5. A glass run channel comprising a generally channel shaped core portion of flat, continuous sheet metal, said core portion having transverse slits extending alternately from opposite edges of its sides, each slit terminating adjacent the opposite edge from which it extends and regularly decreasing in width from its open to its closed end, to form a series of alternately and oppositely disposed triangularly shaped openings therein.

6. A glass run channel comprising a generally channel shaped core portion of flat, continuous sheet metal, said core portion having transverse slits extending alternately from opposite edges of its sides, each slit terminating adjacent the opposite edge from which it extends and tapering in V-form from its open to its closed end, forming openings each of which extends entirely across one side and the base and terminates in the opposite side.

7. A glass run channel comprising a generally channel shaped core portion of flat, continuous sheet metal, said core portion having transverse slits extending alternately from opposite edges of its sides, each slit terminating adjacent the opposite edge from which it extends and being of greatest width at its open end and a continuous stiffening strip connected to each edge of said core portion and extending throughout the length thereof.

8. A glass run channel comprising a generally channel shaped core portion of flat, continuous sheet metal, said core portion having transverse slits extending alternately from opposite edges of its sides, each slit terminating adjacent the opposite edge from which it extends and being of greatest width at its open end, and a continuous flexible stiffening strip permanently connected to said core portion at each of its edges and extending throughout the length thereof.

9. A glass run channel comprising a generally channel shaped core portion of flat, continuous sheet metal, said core portion having transverse slits extending alternately from opposite edges of its sides, each slit terminating adjacent the opposite edge from which it extends and being of greatest width at its open end and a flexible reinforcing wire extending continuously along each edge of said core portion, the edge portions thereof being bent about said wires to form a permanent connection therewith.

10. A glass run channel comprising a generally channel shaped core composed of a strip of continuous sheet metal bent to form a base and side wall portions and having transverse slits extending alternately from opposite edges of its sides, each slit terminating adjacent the opposite edge from which it extends.

DANIEL A. GREENE.